E. E. SLICK.
APPARATUS FOR FINISHING CAR WHEELS AND SIMILAR METAL ARTICLES.
APPLICATION FILED OCT. 26, 1909.
1,029,642.
Patented June 18, 1912.
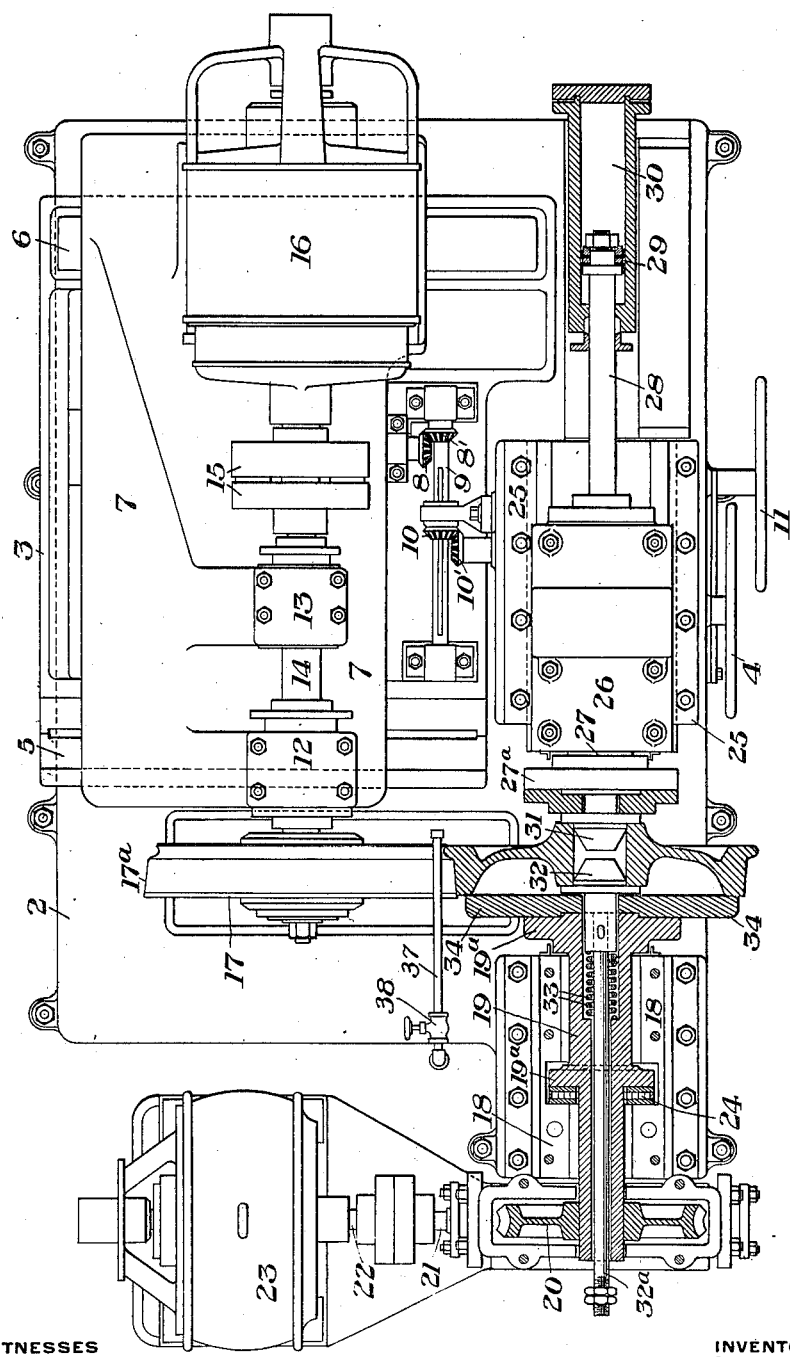
WITNESSES
INVENTOR

UNITED STATES PATENT OFFICE.

EDWIN E. SLICK, OF PITTSBURGH, PENNSYLVANIA.

APPARATUS FOR FINISHING CAR-WHEELS AND SIMILAR METAL ARTICLES.

1,029,642.

Specification of Letters Patent.

Patented June 18, 1912.

Application filed October 26, 1909. Serial No. 524,724.

*To all whom it may concern:*

Be it known that I, EDWIN E. SLICK, of Pittsburgh, Allegheny county, Pennsylvania, have invented certain new and useful Improvements in Apparatus for Finishing Car-Wheels and Similar Metal Articles, of which the following is a full, clear, and exact description, reference being had to the accompanying drawings, forming part of this specification.

In the drawing, a plan view partly in horizontal section is shown of apparatus constructed and arranged in accordance with my invention.

The object of the invention is to provide apparatus for carrying out my improved method having novel means for finishing such metal bodies and having novel means for centering the supporting the wheels or other metal bodies during the finishing operation.

In the drawings, 2 represents the base of the apparatus having ways or slides upon which the carriage 3 is mounted, so as to be longitudinally adjustable in a direction parallel to the axis of the wheel or other article being operated upon, this carriage being adjusted through an adjusting screw and connecting mechanism by the hand wheel 4. Mounted upon the carriage 3 in ways or slides 5 and 6 is a carriage 7, which is arranged to be adjusted transversely on its slides in a direction at right angles to the axis of the wheel or other article being operated upon. The carriage 7 is connected by an adjusting screw having the bevel gear 8 on one end, through the gear 8' on the shaft 9, and the gears 10, 10', with the hand wheel 11, by which it is adjusted transversely. Secured in the bearings 12 and 13 on the carriage 7 is a shaft 14 which is connected by the flexible coupling 15 to the armature shaft of the driving motor 16, this motor preferably being mounted as shown on the carriage 7, so as to be movable longitudinally and transversely with the carriage. On one end of the shaft is a circular metallic disk 17, having a surface 17ª, formed so as to shape the article being operated upon to the desired contour and size.

Mounted in the stationary bearing 18 on the base 2 is a hollow shaft 19, having a worm wheel 20 on one end and meshing with the teeth of the worm wheel 20 is a worm on the shaft 21, which is connected to and rotated by the armature shaft 22 of the motor 23. The hollow shaft 19 is provided with a thrust collar 19ª, by which end thrust on the shaft is transmitted through the roller thrust bearing 24 to the bearing 18. Secured in ways or slides 25 on the base 2 of the apparatus so as to be longitudinally adjustable is a bearing 26 having a shaft 27. The shaft 27 is constructed and arranged in the bearing 26 and is provided with a thrust collar and roller thrust bearing in a similar manner to the shaft 19 and one end of this bearing 26 is connected to one end of the piston rod 28 having a piston 29 which is reciprocated in the fluid pressure cylinder 30, also secured on the base 2, for a purpose described later. The opposing ends of the shafts 19 and 27, which shafts are in alinement, are provided with flanges 19ª, 27ª, and inserted in the registering central openings in these shafts are centers 31, 32, having projecting conical ends. The center 31 is detachably secured in place on the shaft 27, and the center 32 is attached to one end of the rod or shaft 32ª, which extends through the opening in the hollow shaft 19, so as to move longitudinally with the rod. A spiral spring 33 in the recessed opening in the shaft 19 is arranged to press the center 32 forwardly when this center is not employed in holding a wheel or other body in position while being finished or machined. Secured in place on the flange 19ª of the shaft 19, so as to rotate with this shaft is a disk or ring 34, against which the side of the wheels are held secured during the finishing operation, by means of the center 31 and shaft in the axially adjustable bearing 26.

Water, oil or other cooling medium is supplied through the pipe 37, which is connected to a source of supply, to the point of application on the article being finished, the supply being regulated by means of the valve 38.

In the operation of the apparatus, the center 31 is retracted by means of the piston rod 28, and piston 29 in the cylinder 30. The wheel or other article to be finished is then swung into position, so that the bore of the wheel surrounds the center 32, the center 32 being caused to project forwardly by the action of the spring 33, when the wheel is being put into position. Fluid pressure is admitted to the cylinder 30 to advance the piston 29 and rod 28, so as to bring the center 31 into the bore of the wheel or blank. The forward movement of the piston will cause the center 32 to move backwardly until the side of the wheel or other article is in engagement with the disk 34, on the flanged end of the shaft 19. The fluid pressure in the cylinder 30 holds the wheel or other article in this position during the finishing or machining operation. The motor 23 is then caused to rotate and the motor 16 is started in operation so as to revolve the metal disk 17 at a very high rate of speed, preferably such that its periphery moves at a rate of several miles per minute. By means of the hand wheels 4 and 11, the periphery 17ª of the metal disk 17 is brought into engagement with the periphery of the article to be finished. As the rapidly revolving peripheral surface of the disk 17 contacts with that of the wheel or other article, the action of the contacting disk removes surplus metal from the wheel and finishes it to the desired size. The periphery 17ª of the disk 17 is formed to the desired contour of the flange and thread of the wheel when such article is being finished. The center 31 is then retracted and the wheel is removed from the centers 31 and 32, and another wheel or similar article is placed in position, when the above described operations are again carried out.

Modifications in the construction and arrangement of the parts may be made without departing from my invention. The size and shape of the metallic finishing disk may be varied and the means employed in revolving this disk may be changed, and other changes may be made within the scope of the claims.

I claim:

1. Apparatus for finishing cylindrical articles, comprising a rotary support having opposing shafts, centering pins on the adjacent ends of said shafts, means for positively rotating at least one of said shafts, and means for relatively moving said shafts longitudinally into and out of supporting position, said centering pins being arranged to move longitudinally and simultaneously in one and the same direction, when the shafts are moved into and out of supporting position.

2. Apparatus for finishing cylindrical articles, comprising a rotary support for the articles having opposing shafts, centering pins on the adjacent ends of said shafts, at least one of said pins being longitudinally movable relative to the shaft on which it is mounted, and yielding means for normally holding said longitudinally movable pin in extended position when the shafts and support are in retracted position.

3. Apparatus for finishing cylindrical articles having a rotary support for the articles, a flat disk on said support, and fluid pressure means for moving and holding the articles being finished in frictional engagement with said disk during the finishing operations, a centering pin mounted in said disk in axial alinement therewith and longitudinally movable relative thereto, and means yieldingly holding said pin in its extended position.

4. Apparatus for finishing cylindrical articles, comprising opposing shafts, centering pins on the adjacent ends of said shafts, means for rotating said shafts, at least one of said shafts being positively rotated, and means for relatively moving said shafts longitudinally into and out of supporting position, said pins being arranged to move longitudinally in one and the same direction when the shafts are relatively moved to separate the shafts.

5. Apparatus for finishing cylindrical articles, comprising opposing shafts, centering pins on the adjacent ends of said shafts, means for rotating said shafts, at least one of said shafts being positively rotated, and means for relatively moving said shafts longitudinally into and out of supporting position, said pins being arranged to move longitudinally in one and the same direction when the shafts are relatively moved toward each other.

In testimony whereof, I have hereunto set my hand.

EDWIN E. SLICK.

Witnesses:
R. D. LITTLE,
H. M. CORWIN.